US012703029B2

(12) United States Patent
Jiang et al.

(10) Patent No.: US 12,703,029 B2
(45) Date of Patent: Aug. 11, 2026

(54) INDEXABLE DRILLING TOOL

(71) Applicant: ZHUZHOU CEMENTED CARBIDE CUTTING TOOLS CO., LTD., Hunan (CN)

(72) Inventors: Aisheng Jiang, Hunan (CN); Xun Li, Hunan (CN); Aimin Tang, Hunan (CN); Junbo Xue, Hunan (CN)

(73) Assignee: ZHUZHOU CEMENTED CARBIDE CUTTING TOOLS CO., LTD., Hunan (CM)

( * ) Notice: Subject to any disclaimer, the term of this patent is extended or adjusted under 35 U.S.C. 154(b) by 1261 days.

(21) Appl. No.: 17/266,620

(22) PCT Filed: Sep. 5, 2018

(86) PCT No.: PCT/CN2018/104112
§ 371 (c)(1),
(2) Date: Feb. 8, 2021

(87) PCT Pub. No.: WO2020/034270
PCT Pub. Date: Feb. 20, 2020

(65) Prior Publication Data

US 2021/0291283 A1 Sep. 23, 2021

(30) Foreign Application Priority Data

Aug. 14, 2018 (CN) ......................... 201810922447.2

(51) Int. Cl.
*B23B 51/00* (2006.01)
*B23C 5/20* (2006.01)

(52) U.S. Cl.
CPC ...... *B23B 51/0011* (2022.01); *B23B 51/0008* (2022.01); *B23C 5/202* (2013.01)

(58) Field of Classification Search
CPC . B23B 51/00; B23B 51/0011; B23B 51/0006; B23B 51/0007; B23B 51/0008; B23B 2251/50
See application file for complete search history.

(56) References Cited

U.S. PATENT DOCUMENTS 4,659,264 A 4/1987 Friedline
8,192,113 B2 * 6/2012 Limell ................ B23B 27/1614 407/113

(Continued)

FOREIGN PATENT DOCUMENTS

CN 2113846 8/1992
CN 2160487 4/1994

(Continued)

OTHER PUBLICATIONS

"International Search Report (Form PCT/ISA/210) of PCT/CN2018/104112," mailed on Apr. 19, 2019, pp. 1-4.

*Primary Examiner* — Sunil K Singh
(74) *Attorney, Agent, or Firm* — JCIP GLOBAL INC.

(57) ABSTRACT

An indexable drilling tool includes a cutter body, an outer blade and an inner blade. The inner blade is surrounded by a first upper surface, a first lower surface and a first side surface. The first upper surface intersects with the first side surface to form multiple identical inner cutting edges. When drilling, a cutting area of the inner cutting edge as a main cutting edge is located between a central inner point and a central outer point on the inner cutting edge. In a feed direction, an inner convex cutting portion with a maximum cutting depth is arranged between the central inner point and the central outer point. Distances between the central inner point and the inner convex cutting portion and between the central outer point and the inner convex cutting portion in an (Continued)

axial direction are H1 and H2 respectively, which meets the following requirement: $0.9H2 \le H1 \le 1.1H2$.

17 Claims, 7 Drawing Sheets

(56) References Cited

U.S. PATENT DOCUMENTS 8,979,443 B2 * 3/2015 Okumura .............. B23B 27/143
408/1 R
9,221,108 B2 * 12/2015 Bae ......................... B23B 51/00

FOREIGN PATENT DOCUMENTS

| | | |
|---|---|---|
| CN | 102773526 | 11/2012 |
| CN | 204135419 | 2/2015 |
| JP | H09290312 | 11/1997 |

* cited by examiner

INDEXABLE DRILLING TOOL

CROSS-REFERENCE TO RELATED APPLICATION

This application is a 371 of international application of PCT application serial no. PCT/CN2018/104112, filed on Sep. 5, 2018, which claims the priority benefit of China application no. 201810922447.2, filed on Aug. 14, 2018. The entirety of each of the above mentioned patent applications is hereby incorporated by reference herein and made a part of this specification.

BACKGROUND

Technical Field

The present invention relates to the field of metal cutting, in particular to an indexable drilling tool.

Description of Related Art

Cutting edges of an indexable drilling tool are asymmetric with respect to a central axis, and a cutting portion thereof comprises an inner blade and an outer blade. The inner blade and the outer blade complete machining of respective different cutting areas. Specifically, the inner blade completes removal of materials at a central area, and the outer blade completes removal of peripheral materials. A linear velocity of a cutting edge of the drilling tool increases with an increase of a radius. Therefore, the linear velocity at the central area of the inner blade approaches zero, the cutting edge at the central area of the drilling tool has severe friction, and much more materials are removed from the cutting edge near a peripheral surface of the cutter body than that from a center. In order to meet requirements of different cutting conditions of the inner blade and the outer blade, in the prior art, the inner blade and the outer blade have different structures or have identical structure with different mounting dimensions. Although wear resistance and impact resistance of the inner blade and the outer blades can be improved to a certain extent through such a structure, it is hard to balance a radial force of a cutting tool when the inner blade and the outer blade are involved in the cutting due to independence of the inner blade and the outer blade mounted on the cutter body. Unbalance of a cutting force tends to produce cutting vibration, which not only reduces quality of a machining surface and dimensional accuracy of a hole, but also greatly reduces a service life of the indexable drilling tool.

In order to balance the radial cutting force of the inner blade and the outer blades, in the prior art, by changing cutting widths of the inner blade and the outer blade and distributing the inner blade and outer blade at asymmetric phase angles in a circumferential direction of the cutter body, the cutting force of the inner blade and the outer blade are reasonably distributed in a radial direction. However, in the process of drilling, in order to ensure cutting stability in the process of cutting into a workpiece with the inner blade and the outer blade, main cutting edges of the inner blade and the outer blade do not cut into the workpiece at the same time, but are inclined to the machining surface. As a result, radial balance of the inner blade and the outer blade is not only affected by the cutting force, but also directly related to an inclination degree of the inner blade and the outer blade. More importantly, since wear of the inner blade and the outer blade is asynchronous, asynchronous changes in the wear may also break the balance between the inner blade and the outer blade. The radial balance refers to a double radial balance in a cutting plane and in an end plane. Due to complex blade structure, great difference in cutting linear velocity between the inner blade and the outer blade, and interaction of the radial balance between the cutting plane and the end plane, it is very hard to ensure the radial force balance of the cutting plane and the end plane of the drilling tool. Although the above technical means can solve the problem of the radial balance of the inner blade and the outer blade theoretically, due to differences in cutting edge shape, cutting angle, mounting angle and rake angle of the inner blade and the outer blade, it is very difficult to realize the radial force balance of the inner blade and the outer blades in the process of actual machining, so that it is easy to produce the cutting vibration when cutting, resulting in large diameter deviation of a machined hole and poor machining surface quality, and the inner blade and the outer blades are prone to collapse.

SUMMARY

A technical problem to be solved by the invention is to overcome shortcomings of the prior art and provide an indexable drilling tool with small cutting vibration, strong radial balance ability, good machining surface quality and high dimensional accuracy.

In order to solve the above technical problem, the present invention adopts the following technical solution.

An indexable drilling tool comprises a cutter body, an outer blade and an inner blade. The cutter body comprises a shank portion, a cutting end portion and a peripheral surface located between the shank portion and the cutting end portion. The shank portion and the peripheral surface are symmetric with respect to a rotating central axis of the cutter body. The cutting end portion is provided with a central groove and a circumferential groove communicated with a spiral groove on the peripheral surface, the central groove is arranged adjacent to the rotating central axis, and the circumferential groove is arranged adjacent to the peripheral surface. The outer blade is arranged in the circumferential groove for machining an outer ring area of a hole, and the inner blade is arranged in the central groove for machining a central area of the hole. The inner blade is surrounded by a first upper surface, a first lower surface and a first side surface connecting the first upper surface and the first lower surface. The first upper surface intersects with the first side surface to form multiple identical inner cutting edges. When drilling, a cutting area of the inner cutting edge served as a main cutting edge is located between a central inner point and a central outer point on the inner cutting edge. In a feed direction of the indexable drilling tool, an inner convex cutting portion having a maximum cutting depth is arranged between the central inner point and the central outer point. A distance between the central inner point and the inner convex cutting portion in an axial direction of the indexable drilling tool is H1, and a distance between the central outer point and the inner convex cutting portion in an axial direction of the indexable drilling tool is H2, which meets the following requirement: $0.9H2 \leq H1 \leq 1.1H2$.

As a further improvement of the above technical solution.

The outer blade is surrounded by a second upper surface, a second lower surface and a second side surface connecting the second upper surface and the second lower surface. The second upper surface intersects with the second side surface to form multiple identical outer cutting edges. When drilling, a cutting area of the outer cutting edge as a main cutting edge is located between a peripheral inner point and a peripheral outer point on the outer cutting edge. In a feed direction of the indexable drilling tool, an outer convex cutting portion with a maximum cutting depth is arranged between the peripheral inner point and the peripheral outer point. A distance between the peripheral inner point and the outer convex cutting portion in the axial direction of the indexable drilling tool is H1', and a distance between the peripheral outer point and the outer convex cutting portion in the axial direction of the indexable drilling tool is H2', which meets the following requirement: 0.95H1'≤H2'≤1.1H1'.

A machining diameter of the indexable drilling tool is D. In the feed direction of the indexable drilling tool, the inner convex cutting portion cuts into a workpiece earlier than the outer convex cutting portion, and a cutting depth difference is H3, which meets the following requirement: 0.003D≤H3≤0.01D.

A cutting width of the inner blade is Ae, and a cutting width of the outer blade is Ae', which meets the following requirement: 0.8Ae'≤Ae≤0.95 Ae'.

In a radial direction of the indexable drilling tool, a distance between the inner convex cutting portion on the inner cutting edge as the main cutting edge and the central inner point corresponding to the inner convex cutting portion is d1, and a distance between the inner convex cutting portion on the inner cutting edge as the main cutting edge and the central outer point corresponding to the inner convex cutting portion is d2, which meets the following requirement: 1 mm≤d2≤d1.

In the radial direction of the indexable drilling tool, a distance between the outer convex cutting portion on the outer cutting edge as the main cutting edge and the peripheral inner point corresponding to the outer convex cutting portion is d1', and a distance between the outer convex cutting portion on the outer cutting edge as the main cutting edge and the peripheral outer point corresponding to the outer convex cutting portion is d2' respectively, which meets the following requirement: 0.3d2'≤d1'≤d2'.

A single inner cutting edge of the inner blade is provided with a number M of inner convex cutting portions, and each of the outer cutting edges of the outer blade is provided with a number N of outer convex cutting portions, which meets the following requirements: 1≤M≤3, and 1≤N≤3.

The first upper surface intersects with the first side surface to form three or four groups of the inner cutting edges. Each inner cutting edge comprises two inner straight edges and one inner corner edge connecting the two inner straight edges. The inner convex cutting portion is formed between the two inner straight edges.

The second upper surface intersects with the second side surface to form three or four groups of the identical outer cutting edges. Each outer cutting edge comprises two outer straight edges and one outer corner edge connecting the two outer straight edges. The outer convex cutting portion is formed between the two outer straight edges.

In a circumferential direction of the indexable drilling tool, an included angle between the outer blade and the inner blade is β, which meets the following requirement: β=180°.

The outer blade is surrounded by a second upper surface, a second lower surface and a second side surface connecting the second upper surface and the second lower surface. The second upper surface intersects with the second side surface to form multiple identical outer cutting edges. Each outer cutting edge comprises one outer straight edge and one outer corner edge, and the outer straight edges of adjacent outer cutting edges are connected by the outer corner edge.

A machining diameter of the indexable drilling tool is D. In a feed direction of the indexable drilling tool, the inner convex cutting portion cuts into a workpiece earlier than the outer cutting edges, and a cutting depth difference is H3, which meets the following requirement: 0.003D≤H3≤0.01D.

In a circumferential direction of the indexable drilling tool, an included angle between the outer blade and the inner blade is β, which meets the following requirement: 165°≤β≤178°.

Compared with the prior art, the present invention has the following advantages.

(1) The indexable drilling tool of the present invention is provided with the inner convex cutting portion with the maximum cutting depth between the central inner point and the central outer point, the radial force generated by the cutting edges located between the central inner point and the inner convex cutting portion is in opposite direction to the radial force generated by the cutting edges located between the central outer point and the inner convex cutting portion in the cutting plane, and the distances between the central inner point and the inner convex cutting portion and between the central outer point and the inner convex cutting portion in the axial direction of the indexable drilling tool are H1 and H2 respectively, which meets the following requirement: 0.9H2≤H1≤1.1H2. Therefore, the radial force generated by the cutting edges located between the central inner point and the inner convex cutting portion and the radial force generated by the cutting edges located between the central outer point and the inner convex cutting portion are essentially balanced in the cutting plane. That is, regardless of the cutting edge shape, cutting angle, mounting angle and rake angle of the inner blade, the inner blade itself can achieve the radial force balance in the cutting plane. Therefore, when considering mounting dimensions of the inner blade and the outer blade, it is not necessary to consider influence of the cutting edge shape, cutting angle, mounting angle and rake angle of the inner blade on the radial balance thereof in the cutting plane, and it is only necessary to achieve balance of the cutting force in the end plane. Thus, the mounting dimensions of the inner blade and the outer blade can be obtained more easily, and the double radial balance of the cutting plane and the end surface of the indexable drilling tool can be realized. Therefore, the indexable drilling tool has small cutting vibration, good machining surface quality, and high dimensional accuracy. Meanwhile, because the inner blade has achieved the radial balance in the cutting plane, the radial balance of the inner blade in the cutting plane will not be affected even if the inner blade and the outer blade experience asynchronous wear and generate asynchronous change in the cutting force under the influence of the cutting speed, which greatly improves the cutting stability of the inner blade and prolongs the service life of the inner blade.

(2) The indexable drilling tool of the present invention is provided with the outer convex cutting portion with the maximum cutting depth between the peripheral inner point and the peripheral outer point, the cutting force generated by the cutting edges located between the peripheral inner point and the outer convex cutting portion is in opposite direction to the cutting force generated by the cutting edges located between the peripheral outer point and the outer convex cutting portion in the cutting plane, and the distances between the peripheral inner point and the outer convex cutting portion and between the peripheral outer point and the outer convex cutting portion in the axial direction of the indexable drilling tool are H1' and H2' respectively, which meets the following requirement: 0.95H1'≤H2'≤1.1H1'. Therefore, the cutting force generated by the cutting edges located between the peripheral inner point and the outer convex cutting portion and the cutting force generated by the cutting edges located between the peripheral outer point and the outer convex cutting portion are essentially balanced in the cutting plane. That is, regardless of the cutting edge shape, cutting angle, mounting angle and rake angle of the outer blade, the outer blade itself can achieve the radial balance in the cutting plane. That is, the inner blade and the outer blade can achieve the radial balance in the cutting plane. Therefore, when considering mounting dimensions of the inner blade and the outer blade, it is not necessary to consider influence of the cutting edge shape, cutting angle, mounting angle and rake angle of the inner blade and the outer blade on the radial balance thereof in the cutting plane, and it is only necessary to achieve balance of the cutting force in the end plane. Thus, the mounting dimensions of the inner blade and the outer blade can be obtained more easily, and the radial balance of the indexable drilling tool can be realized. Therefore, the indexable drilling tool has small cutting vibration, good machining surface quality, and high dimensional accuracy. Meanwhile, because the inner blade and the outer blade have achieved respective radial balance in the cutting plane, the radial balance of the inner blade and the outer blade in the cutting plane will not be affected even if the inner blade and the outer blade experience asynchronous wear and generate asynchronous change in the cutting force under the influence of the cutting speed, which greatly improves the cutting stability of the inner blade and the outer blade, prolongs the service life of the inner blade and the outer blade, prolongs the service life of the indexable drilling tool, and improves the machining surface quality and the dimensional accuracy while always guaranteeing consistency of the machining surface quality and the dimensional accuracy.

DESCRIPTION OF THE EMBODIMENTS

Figure 1:
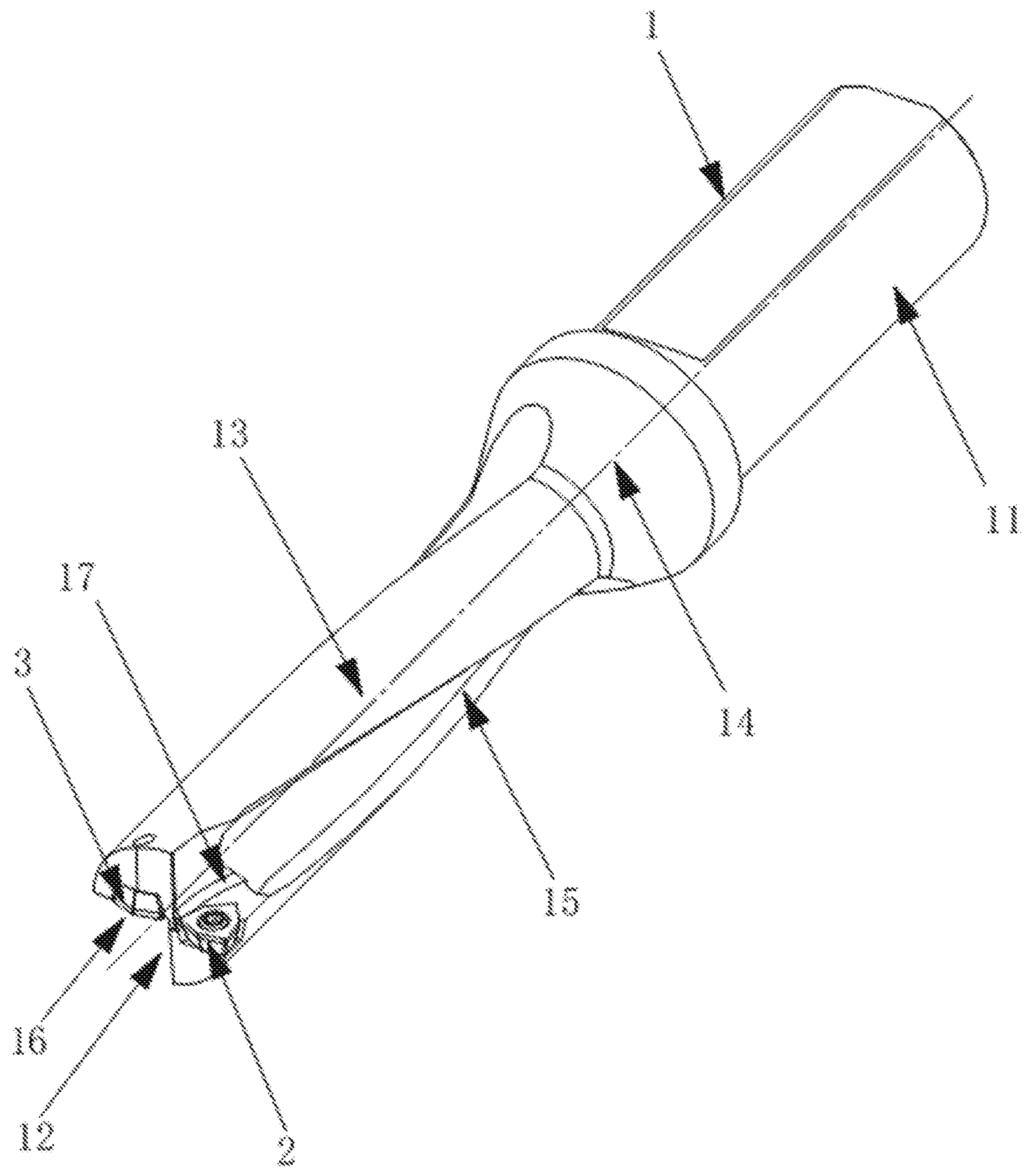
FIG. 1 is a stereogram of a first embodiment of an indexable drilling tool according to the present invention.
Figure 2:
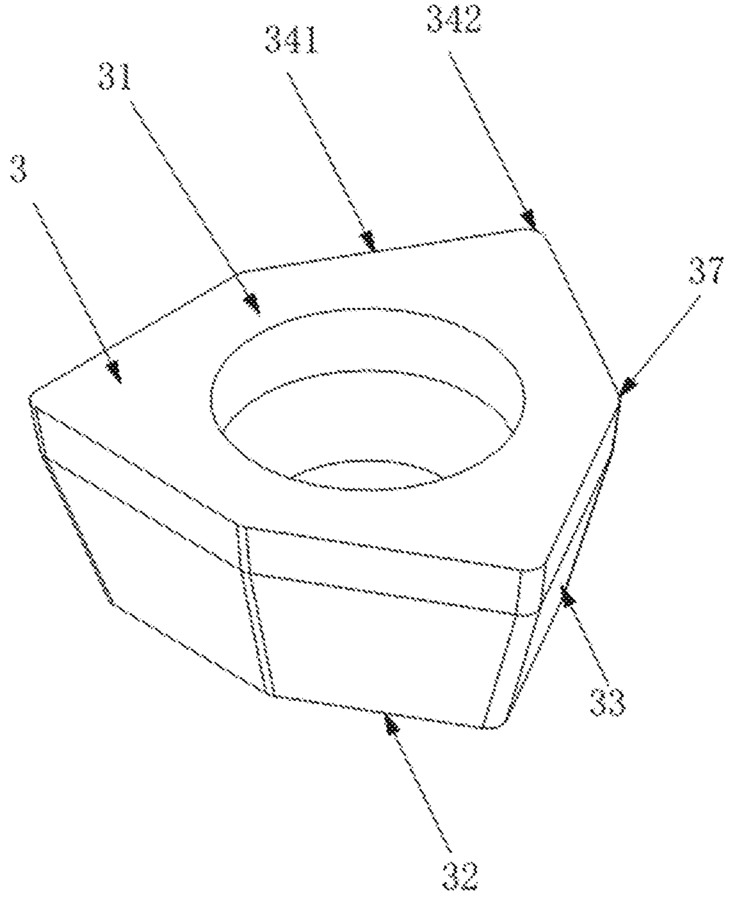
FIG. 2 is a stereogram of an inner blade of the first embodiment of the indexable drilling tool according to the present invention.
Figure 3:
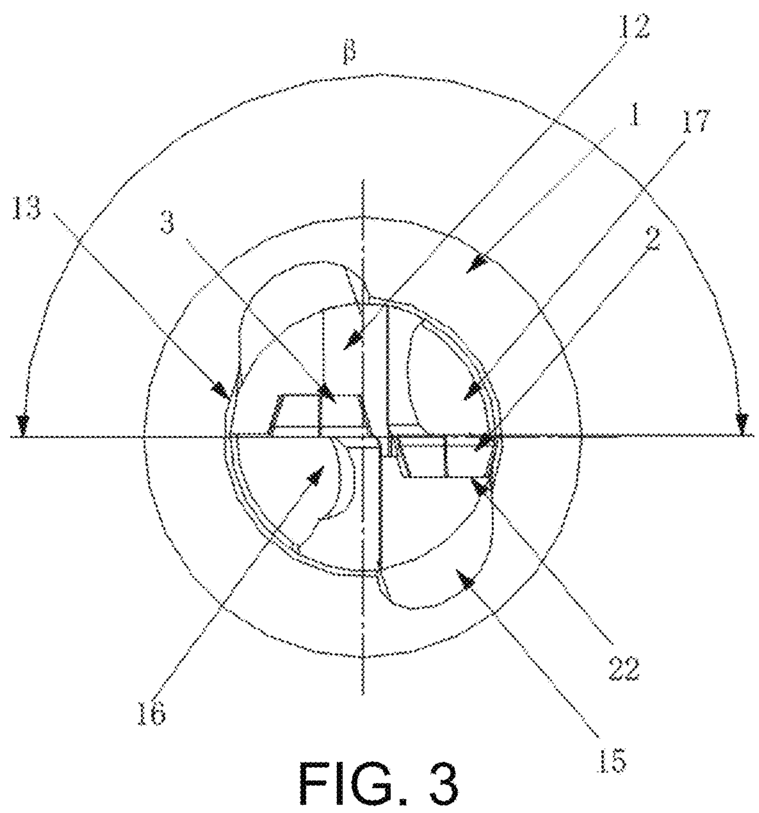
FIG. 3 schematically shows an end surface of the first embodiment of the indexable drilling tool according to the present invention.
Figure 4:
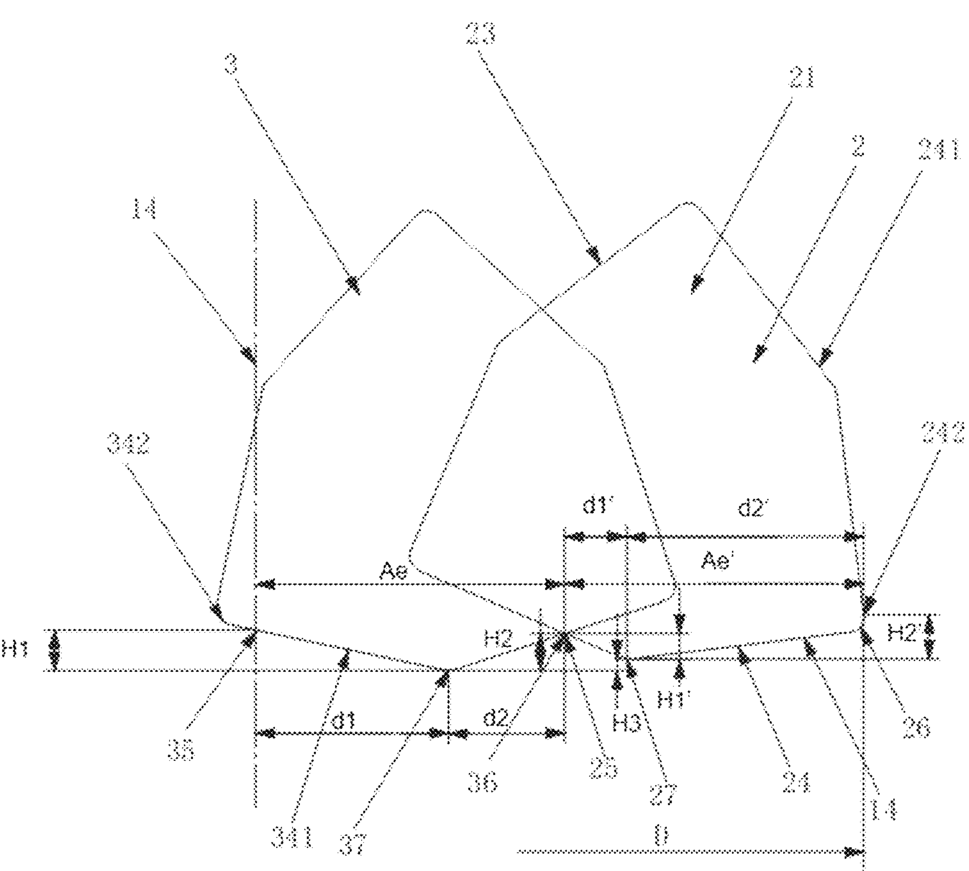
FIG. 4 schematically shows mounting of the inner blade and an outer blade of the first embodiment of the indexable drilling tool according to the present invention.
Figure 5:
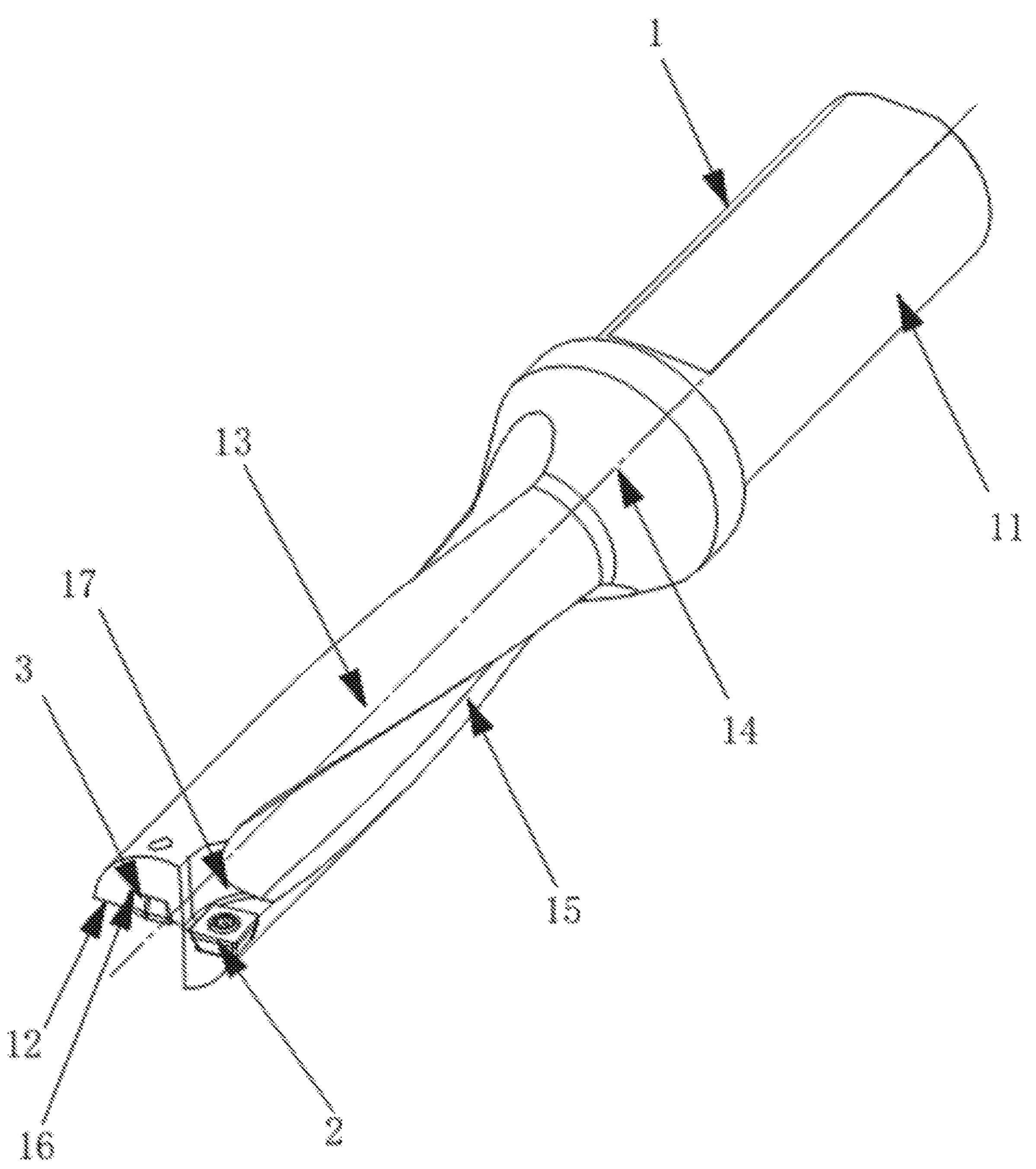
FIG. 5 is a stereogram of a second embodiment of the indexable drilling tool according to the present invention.

The present invention will be further explained in detail in combination with the drawings and specific embodiments.

FIG. 1 to FIG. 4 show a first embodiment of the indexable drilling tool of the present invention, comprising a cutter body 1, an outer blade 2 and an inner blade 3. The cutter body 1 comprises a shank portion 11, a cutting end portion 12 and a peripheral surface 13 located between the shank portion 11 and the cutting end portion 12. The shank portion 11 and the peripheral surface 13 are symmetric with respect to a rotating central axis 14 of the cutter body 1. The cutting end portion 12 is provided with a central groove 16 and a circumferential groove 17 communicated with a spiral groove 15 on the peripheral surface 13, the central groove 16 is arranged adjacent to the rotating central axis 14, and the circumferential groove 17 is arranged adjacent to the peripheral surface 13. The outer blade 2 is arranged in the circumferential groove 17 for machining an outer ring area of a hole, and the inner blade 3 is arranged in the central groove 16 for machining a central area of the hole. The inner blade 3 is surrounded by a first upper surface 31, a first lower surface 32 and a first side surface 33 connecting the first upper surface 31 and the first lower surface 32. The first upper surface 31 intersects with the first side surface 33 to form multiple identical inner cutting edges 34. When drilling, a cutting area of the inner cutting edge 34 served as a main cutting edge is located between a central inner point 35 and a central outer point 36 on the inner cutting edge 34. In a feed direction of the indexable drilling tool, an inner convex cutting portion 37 having a maximum cutting depth is arranged between the central inner point 35 and the central outer point 36. A distance between the central inner point 35 and the inner convex cutting portion 37 in an axial direction of the indexable drilling tool is H1, and a distance between the central outer point 36 and the inner convex cutting portion 37 in an axial direction of the indexable drilling tool is H2, which meets the following requirement: 0.9H2≤H1≤1.1H2. A cutting force generated by cutting edges located between the central inner point 35 and the inner convex cutting portion 37 is in opposite direction to a cutting force generated by cutting edges located between the central outer point 36 and the inner convex cutting portion 37 in a cutting plane In the present embodiment, H1=1.05H2. Therefore, the cutting force generated by the cutting edges located between the central inner point 35 and the inner convex cutting portion 37 and the radial force generated by the cutting edges located between the central outer point 36 and the inner convex cutting portion 37 are essentially balanced in the cutting plane. That is, regardless of the cutting edge shape, cutting angle, mounting angle and rake angle of the inner blade 3, the inner blade 3 itself can achieve a radial balance in the cutting plane. Therefore, when considering mounting dimensions of the inner blade 3 and the outer blade 2 on the cutter body 1, it is not necessary to consider influence of the cutting edge shape, cutting angle, mounting angle and rake angle of the inner blade 3 on the radial balance thereof in the cutting plane, and it is only necessary to achieve balance of the cutting force in the end plane. Thus, the mounting dimensions of the inner blade 3 and the outer blade 2 can be obtained more easily, and the radial balance of the indexable drilling tool can be realized. Therefore, the indexable drilling tool has small cutting vibration, good machining surface quality, and high dimensional accuracy. Meanwhile, because the inner blade 3 has achieved the radial balance in the cutting plane, the radial balance of the inner blade 3 in the cutting plane will not be affected even if the inner blade 3 and the outer blade 2 experience asynchronous wear and generate asynchronous change in the cutting force under the influence of the cutting speed, which greatly improves the cutting stability of the inner blade 3 and prolongs the service life of the inner blade 3.

In the present embodiment, the outer blade 2 has a similar structure to the inner blade 3. That is, the outer blade 2 is surrounded by a second upper surface 21, a second lower surface 22 and a second side surface 33 connecting the second upper surface 21 and the second lower surface 22. The second upper surface 21 intersects with the second side surface 23 to form multiple identical outer cutting edges 24. When drilling, a cutting area of the outer cutting edge 24 served as a main cutting edge is located between a peripheral inner point 25 and a peripheral outer point 26 on the outer cutting edge 24. In the feed direction of the indexable drilling tool, an outer convex cutting portion 27 having a maximum cutting depth is arranged between the peripheral inner point 25 and the peripheral outer point 26. A cutting force generated by cutting edges located between the peripheral inner point 25 and the outer convex cutting portion 27 is in opposite direction to a cutting force generated by cutting edges located between the peripheral outer point 26 and the outer convex cutting portion 27 in the cutting plane. A distance between the peripheral inner point 25 and the outer convex cutting portion 27 in the axial direction of the indexable drilling tool is H1', and a distance between the peripheral outer point 26 and the outer convex cutting portion 27 in the axial direction of the indexable drilling tool is H2', which meets the following requirement: $0.95H1' \leq H2' \leq 1.1H1'$. In the present embodiment, $H2' = 1.05H1'$. Therefore, the cutting force generated by the cutting edges located between the peripheral inner point 25 and the outer convex cutting portion 27 and the radial force generated by the cutting edges located between the peripheral outer point 26 and the outer convex cutting portion 27 are essentially balanced in the cutting plane. That is, regardless of the cutting edge shape, cutting angle, mounting angle and rake angle of the outer blade 2, the outer blade 2 itself can achieve the radial balance in the cutting plane. That is, the inner blade 3 and the outer blade 2 can achieve the radial balance in the cutting plane. Therefore, when considering the mounting dimensions of the inner blade 3 and the outer blade 2, it is not necessary to consider influence of the cutting edge shape, cutting angle, mounting angle and rake angle of the inner blade 3 and the outer blade 2 on the radial balance thereof in the cutting plane, and it is only necessary to achieve the balance of the cutting force in the end plane. Thus, the mounting dimensions of the inner blade 3 and the outer blade 2 on the cutter body 1 can be obtained more easily, and the radial balance of the indexable drilling tool can be realized. Therefore, the indexable drilling tool has small cutting vibration, good machining surface quality, and high dimensional accuracy. Meanwhile, because the inner blade 3 and the outer blade 2 have achieved respective radial balance in the cutting plane, the radial balance of the inner blade 3 and the outer blade 2 in the cutting plane will not be affected even if the inner blade 3 and the outer blade 2 experience asynchronous wear and generate asynchronous change in the cutting force under the influence of the cutting speed, which greatly improves the cutting stability of the inner blade 3 and the outer blade 2, prolongs the service life of the inner blade 3 and the outer blade 2, prolongs the service life of the indexable drilling tool, and improves the machining surface quality and the dimensional accuracy while always guaranteeing consistency of the machining surface quality and the dimensional accuracy.

A machining diameter of the indexable drilling tool is D. In order to ensure that the cutting force of the cutter body 1 increases slowly but keeps balance in the cutting surface during cutting feed of the inner blade 3 and the outer blade 2 of the indexable drilling tool, in the feed direction of the indexable drilling tool, the inner convex cutting portion 37 cuts into a workpiece earlier than the outer convex cutting portion 27, and a cutting depth difference is H3, which meets the following requirement: $0.003D \leq H3 \leq 0.01D$. In the present embodiment, $H3 = 0.006D$.

In order to ensure the balance of main cutting forces of the inner blade 3 and the outer blade 2 in the end plane, the main cutting forces of the inner blade 3 and the outer blade 2 should be essentially equal. However, due to the influence of assembly dimensions and the cutting speed of the inner blade 3 and the outer blade 2, the main cutting forces of the inner blade 3 and the outer blade 2 do not completely depend on a cutting width. In order to eliminate the influence of different cutting speeds of the inner blade 3 and the outer blade 2 on the radial balance of the main cutting force in the end plane, the cutting width of the inner blade 3 is Ae, and the cutting width of the outer blade 2 is Ae', which meets the following requirement: $0.8Ae' \leq Ae \leq 0.95 Ae'$. In the present embodiment, $Ae = 0.9Ae'$.

In order to eliminate the influence of the different cutting speeds of the cutting edges at both sides of the inner convex cutting portion 37 of the inner blade 3 on the radial balance of the inner blade 3, in the radial direction of the indexable drilling tool, a distance between the inner convex cutting portion 37 on the inner cutting edge 34 as the main cutting edge and the central inner point 35 corresponding to the inner convex cutting portion 37 is d1, and a distance between the inner convex cutting portion 37 on the inner cutting edge 34 as the main cutting edge and the central outer point 36 corresponding to the inner convex cutting portion 37 is d2, which meets the following requirement: $1\ mm \leq d2 \leq d1$. In the present embodiment, $d2 = 0.6d1$.

In order to eliminate the influence of the different cutting speeds of the cutting edges at both sides of the outer convex cutting portion 27 of the outer blade 2 on the radial balance of the outer blade 2, in the radial direction of the indexable drilling tool, a distance between the outer convex cutting portion 27 on the outer cutting edge 24 as the main cutting edge and the peripheral inner point 25 corresponding to the outer convex cutting portion 27 is d1'. and a distance between the outer convex cutting portion 27 on the outer cutting edge 24 as the main cutting edge and the peripheral outer point 26 corresponding to the outer convex cutting portion 27 is d2', which meets the following requirement: $0.3d2' \leq d1' \leq d2'$. In the present embodiment, $d1' = 0.4d2'$.

In order to improve the stability of the inner blade 3 and the outer blade 2 in the cutting process and ensure that the indexable drilling tool still has good vibration resistance, high dimensional accuracy and high surface quality accuracy guarantee ability even if the inner blade 3 and the outer blade 2 experience asynchronous wear and asynchronous change occurs to the cutting force of the inner blade 3 and the outer blade 2 during the cutting process. Each inner cutting edge 34 of the inner blade 3 is provided with a number M of inner convex cutting portions 37, and each outer cutting edge 24 of the outer blade 2 is provided with a number N of outer convex cutting portions 27, which meets the following requirements: 1≤M≤3, and 1≤N≤3. In the present embodiment, M=1, and N=1.

In the present embodiment, the first upper surface 31 intersects with the first side surface 33 to form three groups of inner cutting edges 34. The inner cutting edge 34 comprises two inner straight edges 341 and one inner corner edge 342 connecting the two inner straight edges 341. The inner convex cutting portion 37 is formed between the two inner straight edges 341, and the inner straight edges 341 adjacent to the inner cutting edges 34 are connected by the inner corner edge 342.

In the present embodiment, the second upper surface 21 intersects with the second side surface 23 to form three groups of identical outer cutting edges 24. Each outer cutting edge 24 comprises two outer straight edges 241 and one outer corner edge 242 connecting the two outer straight edges 241. The outer convex cutting portion 27 is formed between the two outer straight edges 241, and the outer straight edges 241 adjacent to the outer cutting edges 24 are connected by the outer corner edge 242.

In the present embodiment, due to similar structure of the inner blade 3 and the outer blade 2, in order to ensure complete radial force balance between the outer blade 2 and the inner blade 3, in a circumferential direction of the indexable drilling tool, an included angle between the outer blade 2 and the inner blade 3 is β, the inner blade 3 and the outer blade 2 achieve the radial balance in the cutting surface, and it is not necessary to adjust the β to adjust a main cutting radial component force in the end plane of the inner blade 3 to balance a component force of the outer blade 2 on the end cutting plane. In order to ensure the balance of the inner blade 3 and the outer blade 2 in the end plane, the upper surfaces of the inner blade 3 and the outer blade 2 in the end plane are arranged parallel, that is, β=180°.

FIG. 5 to FIG. 9 show a second embodiment of the indexable drilling tool of the present invention. A fundamental difference between the present embodiment and the first embodiment is that the inner blade 3 has a different structure from the outer blade 2. In the present embodiment, the outer blade 2 is surrounded by a second upper surface 21, a second lower surface 22 and a second side surface 23 connecting the second upper surface 21 and the second lower surface 22, and the second upper surface 21 intersects with the second side surface 23 to form four identical outer cutting edges 24. The outer cutting edge 24 comprises one outer straight edge 241 and one outer corner edge 242. The outer straight edge 241 of the outer cutting edge 24 is connected by the outer corner edge 242, and the structure of the outer blade 2 is simpler.

Figure 6:
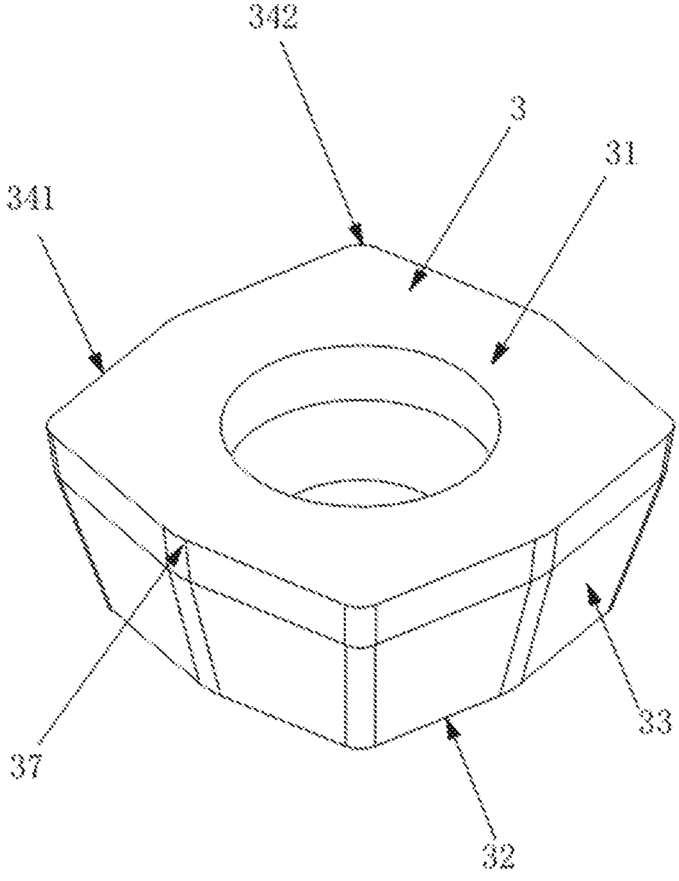
FIG. 6 is a stereogram of an inner blade of the second embodiment of the indexable drilling tool according to the present invention.
Figure 7:
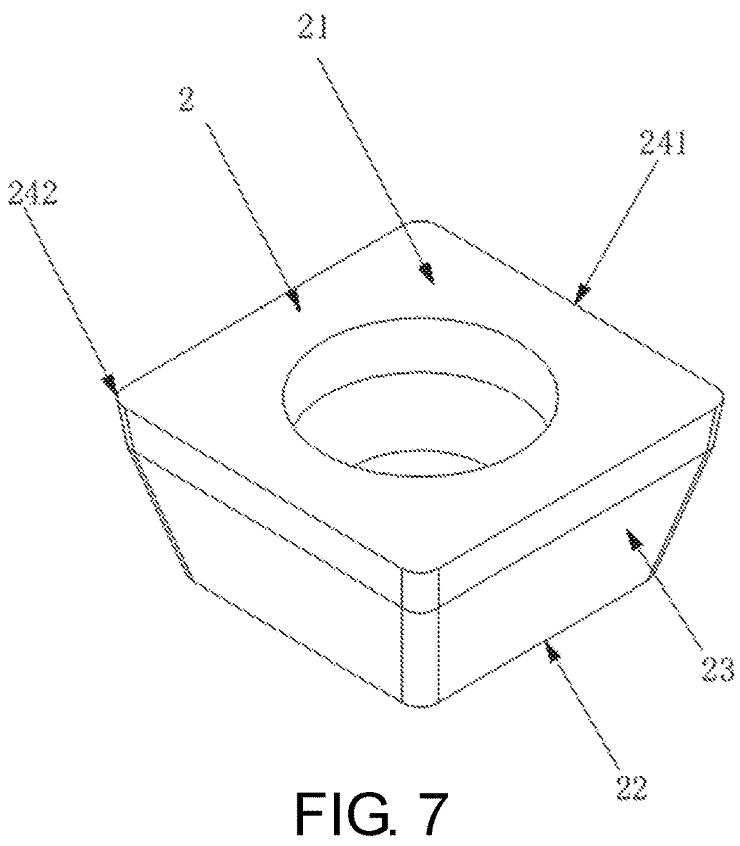
FIG. 7 is a stereogram of an outer blade of the second embodiment of the indexable drilling tool according to the present invention.
Figure 8:
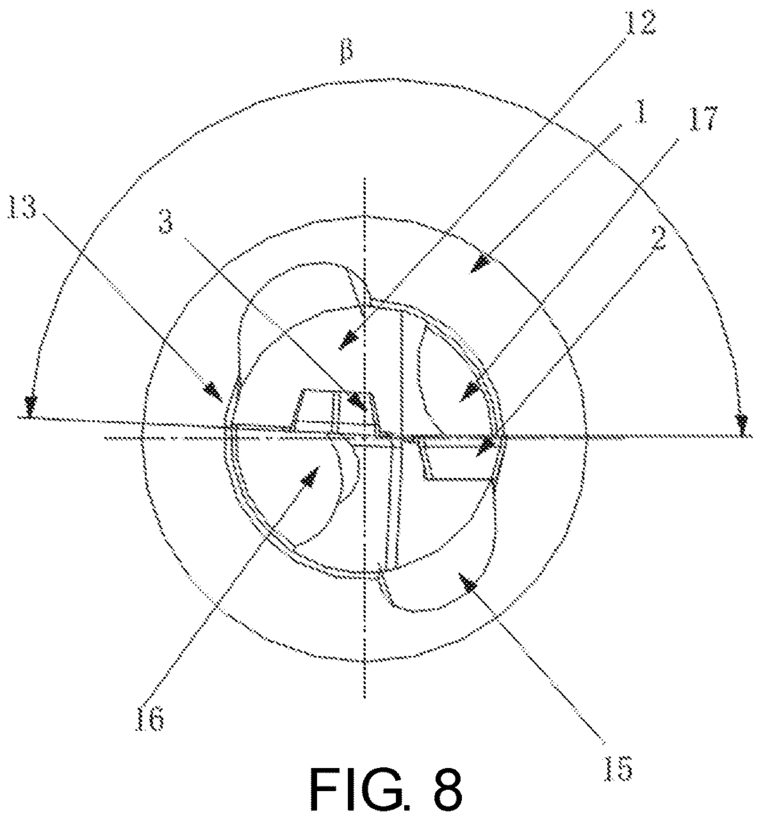
FIG. 8 schematically shows an end surface of the second embodiment of the indexable drilling tool according to the present invention.
Figure 9:
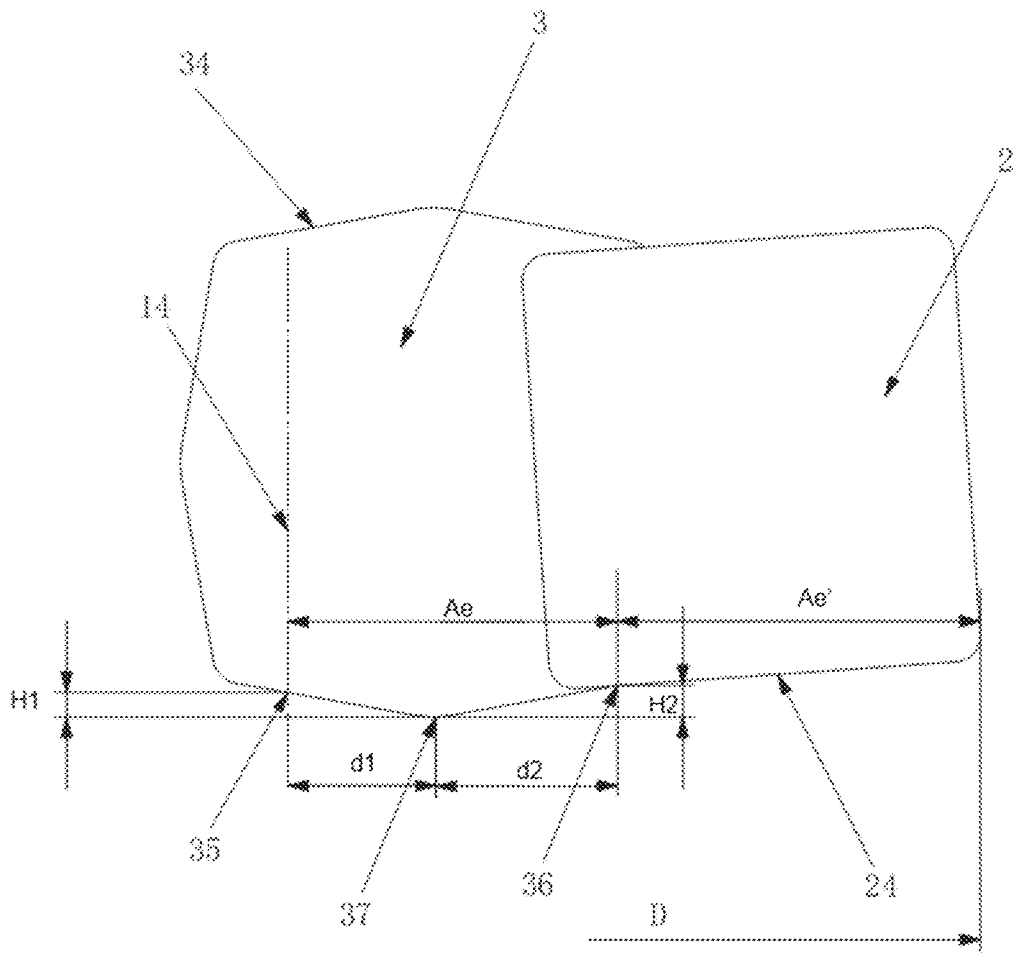
FIG. 9 schematically shows mounting of the inner blade and the outer blade of the second embodiment of the indexable drilling tool according to the present invention.

In the present embodiment, the structure of the inner blade 3 is shown in FIG. 6. The first upper surface 31 intersects with the first side surface 33 to form four groups of inner cutting edges 34. The inner cutting edge 34 comprises two inner straight edges 341 and one inner corner edge 342. The inner convex cutting portion 37 is formed between the two inner straight edges 341. The inner straight edges 341 adjacent to the inner cutting edges 34 are connected by the inner corner edge 342. Similar to the principle of the first embodiment, the inner blade 3 itself can achieve the radial balance in the cutting plane.

A machining diameter of the indexable drilling tool is D. In order to ensure that the cutting force of the cutter body 1 increases slowly but keeps balance in the cutting surface during cutting feed of the inner blade 3 and the outer blade 2 of the indexable drilling tool, in the feed direction of the indexable drilling tool, the inner convex cutting portion 37 cuts into a workpiece earlier than the outer cutting edges 24, and a cutting depth difference is H3, which meets the following requirement: 0.003D≤H3≤0.01D. In the present embodiment, H3=0.006D.

In the present embodiment, during the cutting feed of the inner blade 3 and the outer blade 2 of the indexable drill tool, only the inner blade 3 obtains the radial balance in the cutting surface, while the outer blade 2 does not obtain balanced cutting force in the cutting surface, so that the inner blade 3 and the outer blade 2 cannot obtain final balance in the cutting plane. In order to ensure that the inner blade 3 and the outer blade 2 obtain the balance in the cutting plane and the end cutting surface, an included angle between the outer blade 2 and the inner blade 3 is β in a circumferential direction of the indexable drilling tool, which meets the following requirement: 165°≤β≤178°. In the present embodiment, β=172°.

Although the present invention has been disclosed as above in the preferred embodiments, they are not intended to limit the present invention. Any person skilled in the art may make many possible variations and modifications or make equivalent embodiments with equivalent changes to the technical solution of the present invention utilizing the disclosed technical contents without departing from the scope of the technical solution of the present invention. Therefore, all the contents without departing from the technical solution of the present invention, and any simple amendments, equivalent variations and modifications made to the described embodiments based on the technical spirit of the present invention, would be incorporated in the protection scope of the technical solution of the present invention.

The invention claimed is:

1. An indexable drilling tool, comprising a cutter body, an outer blade and an inner blade, wherein the cutter body comprises a shank portion, a cutting end portion and a peripheral surface located between the shank portion and the cutting end portion, the shank portion and the peripheral surface are symmetric with respect to a rotating central axis of the cutter body, the cutting end portion is provided with a central groove and a circumferential groove communicated with a spiral groove on the peripheral surface, the central groove is arranged adjacent to the rotating central axis, and the circumferential groove is arranged adjacent to the peripheral surface, the outer blade is arranged in the circumferential groove for machining an outer ring area of a hole, and the inner blade is arranged in the central groove for machining a central area of the hole, the inner blade is surrounded by a first upper surface, a first lower surface and a first side surface connecting the first upper surface and the first lower surface, the first upper surface intersects with the first side surface to form multiple identical inner cutting edges, wherein when drilling, a cutting area of the inner cutting edge served as a main cutting edge is located between a central inner point and a central outer point on the inner cutting edge, in a feed direction of the indexable drilling tool, an inner convex cutting portion having a maximum cutting depth is arranged between the central inner point and the central outer point, a distance between the central inner point and the inner convex cutting portion in an axial direction of the indexable drilling tool is H1, a distance between the central outer point and the inner convex cutting portion in the axial direction of the indexable drilling tool is H2, which meets the following requirement: 0.9H2≤H1≤1.1H2, wherein the outer blade is surrounded by a second upper surface, a second lower surface and a second side surface connecting the second upper surface and the second lower surface, the second upper surface intersects with the second side surface to form multiple identical outer cutting edges, when drilling, a cutting area of the outer cutting edge served as a main cutting edge is located between a peripheral inner point and a peripheral outer point on the outer cutting edge, in the feed direction of the indexable drilling tool, an outer convex cutting portion having a maximum cutting depth is arranged between the peripheral inner point and the peripheral outer point, a distance between the peripheral inner point and the outer convex cutting portion in the axial direction of the indexable drilling tool is H1', a distance between the peripheral outer point and the outer convex cutting portion in the axial direction of the indexable drilling tool is H2', which meets the following requirement: $0.95H1' \leq H2' \leq 1.1H1'$, wherein a cutting width of the inner blade is Ae, and a cutting width of the outer blade is Ae', which meets the following requirement: $0.8Ae' \leq Ae \leq 0.95\ Ae'$.

2. The indexable drilling tool as recited in claim 1, wherein a machining diameter of the indexable drilling tool is D, in the feed direction of the indexable drilling tool, the inner convex cutting portion cuts into a workpiece earlier than the outer convex cutting portion, and a cutting depth difference is H3, which meets the following requirement: $0.003D \leq H3 \leq 0.01D$.

3. The indexable drilling tool as recited in claim 1, wherein in a radial direction of the indexable drilling tool, a distance between the inner convex cutting portion on the inner cutting edge as the main cutting edge and the central inner point corresponding to the inner convex cutting portion is d1, and a distance between the inner convex cutting portion on the inner cutting edge as the main cutting edge and the central outer point corresponding to the outer convex cutting portion is d2, which meets the following requirement: $1\ mm \leq d2 \leq d1$.

4. The indexable drilling tool as recited in claim 1, wherein in the radial direction of the indexable drilling tool, a distance between the outer convex cutting portion on the outer cutting edge as the main cutting edge and the peripheral inner point corresponding to the outer convex cutting portion is d1', and a distance between the outer convex cutting portion on the outer cutting edge as the main cutting edge and the peripheral outer point corresponding to the outer convex cutting portion is d2', which meets the following requirement: $0.3d2' \leq d1' \leq d2'$.

5. The indexable drilling tool as recited in claim 1, wherein each of the inner cutting edges of the inner blade is provided with a number M of inner convex cutting portions, and each of the outer cutting edges of the outer blade is provided with a number N of outer convex cutting portions, which meet the following requirements: $1 \leq M \leq 3$, and $1 \leq N \leq 3$.

6. The indexable drilling tool as recited in claim 5, wherein the first upper surface intersects with the first side surface to form three or four groups of the inner cutting edges, each of the inner cutting edges comprises two inner straight edges and one inner corner edge connecting the two inner straight edges, the inner convex cutting portion is formed between two corresponding inner straight edges.

7. The indexable drilling tool as recited in claim 6, wherein the second upper surface intersects with the second side surface to form three or four groups of the identical outer cutting edges, each of the outer cutting edges comprises two outer straight edges and one outer corner edge connecting the two outer straight edges, the outer convex cutting portion is formed between two corresponding outer straight edges.

8. The indexable drilling tool as recited in claim 7, wherein in a circumferential direction of the indexable drilling tool, an included angle between the outer blade and the inner blade is β, which meets the following requirement: $\beta = 180°$.

9. The indexable drilling tool as recited in claim 1, wherein the outer blade is surrounded by a second upper surface, a second lower surface and a second side surface connecting the second upper surface and the second lower surface, the second upper surface intersects with the second side surface to form multiple identical outer cutting edges, each of the outer cutting edges comprises one outer straight edge and one outer corner edge, and the outer straight edges of adjacent outer cutting edges are connected by the outer corner edge.

10. The indexable drilling tool as recited in claim 9, wherein a machining diameter of the indexable drilling tool is D, in a feed direction of the indexable drilling tool, the inner convex cutting portion cuts into a workpiece earlier than the outer cutting edges, and a cutting depth difference is H3, which meets the following requirement: $0.003D \leq H3 \leq 0.01D$.

11. The indexable drilling tool as recited in claim 10, wherein in a circumferential direction of the indexable drilling tool, an included angle between the outer blade and the inner blade is β, which meets the following requirement: $165° \leq \beta \leq 178°$.

12. The indexable drilling tool as recited in claim 9, wherein in a circumferential direction of the indexable drilling tool, an included angle between the outer blade and the inner blade is β, which meets the following requirement: $165° \leq \beta \leq 178°$.

13. The indexable drilling tool as recited in claim 1, wherein the first upper surface intersects with the first side surface to form three or four groups of the inner cutting edges, each of the inner cutting edges comprises two inner straight edges and one inner corner edge connecting the two inner straight edges, the inner convex cutting portion is formed between two corresponding inner straight edges.

14. The indexable drilling tool as recited in claim 2, wherein the first upper surface intersects with the first side surface to form three or four groups of the inner cutting edges, each of the inner cutting edges comprises two inner straight edges and one inner corner edge connecting the two inner straight edges, the inner convex cutting portion is formed between two corresponding inner straight edges.

15. The indexable drilling tool as recited in claim 1, wherein the first upper surface intersects with the first side surface to form three or four groups of the inner cutting edges, each of the inner cutting edges comprises two inner straight edges and one inner corner edge connecting the two inner straight edges, the inner convex cutting portion is formed between two corresponding inner straight edges.

16. The indexable drilling tool as recited in claim 3, wherein the first upper surface intersects with the first side surface to form three or four groups of the inner cutting edges, each of the inner cutting edges comprises two inner straight edges and one inner corner edge connecting the two inner straight edges, the inner convex cutting portion is formed between two corresponding inner straight edges.

17. The indexable drilling tool as recited in claim 4, wherein the first upper surface intersects with the first side surface to form three or four groups of the inner cutting edges, each of the inner cutting edges comprises two inner straight edges and one inner corner edge connecting the two inner straight edges, the inner convex cutting portion is formed between two corresponding inner straight edges.

* * * * *